(12) United States Patent
Hoeven

(10) Patent No.: US 11,659,872 B2
(45) Date of Patent: May 30, 2023

(54) UNDERGARMENT RECEIVING A THIN INTERMEDIATE BONDING LAYER BETWEEN TWO TEXTILES PRIOR TO THERMOFORMING

(71) Applicant: Hanes Operations Europe SAS, Rueil-Malmaison (FR)

(72) Inventor: Manon Turlan-Van Der Hoeven, Marmagne (FR)

(73) Assignee: DBI OPERATIONS EUROPE SAS, Rueil-Malmaison (FR)

( * ) Notice: Subject to any disclaimer, the term of this patent is extended or adjusted under 35 U.S.C. 154(b) by 527 days.

(21) Appl. No.: 16/856,812

(22) Filed: Apr. 23, 2020

(65) Prior Publication Data
US 2020/0245697 A1 Aug. 6, 2020

Related U.S. Application Data

(62) Division of application No. 15/310,707, filed as application No. PCT/FR2015/051273 on May 13, 2015, now Pat. No. 10,638,800.

(30) Foreign Application Priority Data

May 14, 2014 (FR) .................................. 1454298

(51) Int. Cl.
*A41C 5/00* (2006.01)
*A41C 3/00* (2006.01)
(Continued)

(52) U.S. Cl.
CPC ............ *A41C 5/005* (2013.01); *A41C 3/0007* (2013.01); *A41C 3/0014* (2013.01); *A41C 3/10* (2013.01);
(Continued)

(58) Field of Classification Search
CPC ..... A41C 5/005; A41C 3/0007; A41C 3/0014; A41C 3/10
See application file for complete search history.

(56) References Cited

U.S. PATENT DOCUMENTS

| 7,407,429 B2 | 8/2008 | Chen | |
| 2006/0105673 A1* | 5/2006 | Lau | A41C 5/005 450/39 |

(Continued)

FOREIGN PATENT DOCUMENTS

| CN | 1741755 A | 3/2006 |
| CN | 1977682 A | 6/2007 |

(Continued)

OTHER PUBLICATIONS

Australian Government—IP Australia, Application No. 2015261307, Examination Report No. 1 for Standard Patent Application, Jan. 24, 2017, 2 pages.

(Continued)

*Primary Examiner* — Gloria M Hale
(74) *Attorney, Agent, or Firm* — Fish & Richardson P.C.

(57) ABSTRACT

A process for manufacturing an undergarment having two superimposed textiles, comprising depositing on certain parts of reinforcements (8) comprising a thick layer of a shaped memory foam elastic material, the polymerization of this material and also the shaping of the textiles of the undergarment by thermoforming, characterized in that it comprises a step of depositing, on the entire surface of at least the textiles, a thin layer of an elastic adhesive-bonding material, and then a step of polymerizing this thin layer of adhesive bonding during the thermoforming for shaping, and in that it comprises a step of prior depositing, on the textile receiving the layer of reinforcement (8), of a barrier (Continued)

layer of an elastic material, which is polymerized before the depositing of this reinforcement.

11 Claims, 1 Drawing Sheet

(51) Int. Cl.
*A41C 3/10* (2006.01)
*B29C 51/14* (2006.01)
*B29C 51/26* (2006.01)
*B29C 65/48* (2006.01)
*B29K 83/00* (2006.01)
*B29K 105/00* (2006.01)
*B29K 105/08* (2006.01)
*B29L 9/00* (2006.01)
*B29L 31/48* (2006.01)

(52) U.S. Cl.
CPC .......... *B29C 51/145* (2013.01); *B29C 51/264* (2013.01); *B29C 65/4805* (2013.01); *B29K 2083/00* (2013.01); *B29K 2105/0097* (2013.01); *B29K 2105/0809* (2013.01); *B29K 2995/0046* (2013.01); *B29L 2009/00* (2013.01); *B29L 2031/4885* (2013.01)

(56) References Cited

U.S. PATENT DOCUMENTS

| | | | | |
|---|---|---|---|---|
| 2006/0223415 A1* | 10/2006 | Watrin | ................. | A41C 3/0014 450/39 |
| 2007/0004315 A1* | 1/2007 | Luk | ......................... | A41C 3/00 450/39 |
| 2010/0124869 A1* | 5/2010 | Liu | ......................... | A41C 3/10 450/39 |
| 2013/0095728 A1* | 4/2013 | Crompton | ............ | A41C 3/0007 450/41 |

FOREIGN PATENT DOCUMENTS

| | | |
|---|---|---|
| CN | 101541195 A | 9/2009 |
| CN | 103169161 A | 6/2013 |
| CN | 103707563 A | 4/2014 |
| FR | 2850536 B1 | 3/2005 |
| GB | 2469691 | 10/2010 |
| KR | 200302503 | 1/2003 |
| KR | 20050103188 | 10/2005 |
| KR | 100717874 | 5/2007 |
| KR | 100768083 B1 | 10/2007 |
| WO | WO2007031650 A1 | 3/2007 |

OTHER PUBLICATIONS

PCT International Search Report and Written Opinion of the International Searching Authority, PCT/FR2015/051273, dated Aug. 28, 2015, 8 pages.

European Office Action in European Application No. 15732306, dated May 3, 2018, 4 pages.

Office Action in Korean Application No. KR 20167034622, dated Apr. 28, 2022, 17 pages (with English Translation).

* cited by examiner

UNDERGARMENT RECEIVING A THIN INTERMEDIATE BONDING LAYER BETWEEN TWO TEXTILES PRIOR TO THERMOFORMING

CROSS-REFERENCE TO RELATED APPLICATION(S)

This application is a divisional of and claims the benefit of priority to U.S. National Phase application Ser. No. 15/310,707, filed Nov. 11, 2016, which issued as U.S. Pat. No. 10,638,800 B2, and which claims the benefit of priority to International Application Serial No. PCT/FR2015/051273, filed May 13, 2015, which claims priority to French Application Serial No. 1454298, filed May 14, 2014, the contents of which are hereby incorporated by reference.

TECHNICAL FIELD

This disclosure concerns an undergarment manufacturing process as well as undergarments obtained with such a manufacturing process, in particular brassieres.

BACKGROUND

A known manufacturing process of an undergarment, in particular brassieres for women, disclosed among other by document FR-A1-2850536, comprises depositing and cross-linking a thick layer of shaped memory foam material on certain parts of a piece of textile, such as a silicone elastomer, then shaping this piece of textile by thermoforming.

The contour of the undergarment is then cut-out, followed by the attachment of accessories if required, to obtain the finished product.

In general, fine and very elastic textiles are used which may comprise adornments such as embroidery.

The undergarment then obtained comprises elastic areas with predefined shapes, achieved by the shaped memory foam material, which constitute reinforcements that support certain parts of the body to give them a particular appearance.

This way, light and stretchable brassieres are achieved so as not to impede movements by women, comprising cups that give the woman a nice figure through an effective support of the breasts.

In addition, as is well-known, bonding of a second textile onto the first one is added to this process, enclosing inside between the two, the thick reinforcement layer deposited on certain parts, which then produces a bonding between the two textiles. In addition, bonding of the second textile on this first one can be completed outside the elastic reinforcements, with locally deposited silicone spots.

However, the two fabrics are not yet fully joined together; after thermoforming, especially if the reinforcement layer has been molded flat, fabric gathers can be obtained which may be unpleasant to the touch and unsightly. The gathers may also give, in particular if ornamental designs are added to the fabrics, an impression of clutter which is not elegant.

In addition, if one wants to obtain cutout edges of the undergarment with good cohesion, one is forced to extend the thick layer of silicone up to these edges, even though the elastic reinforcement function does not necessarily require it.

In addition, in the case of bonding one fabric onto the other with silicone dots, these dots may be visible and appear ugly.

SUMMARY

The purpose of this disclosure is particularly to avoid these drawbacks of the prior art.

For that purpose, it proposes a manufacturing process of an undergarment that has two superimposed or layered textiles; it comprises depositing, on certain parts, reinforcements comprising a thick layer of shaped memory foam elastic material, polymerization of this material as well as the shaping of undergarment textiles by thermoforming, which is remarkable since it comprises a step of depositing over the full surface of at least one of the textiles, a thin layer of an elastic bonding material, followed by a polymerization step of this thin bonding layer during thermoforming of the shape.

An advantage of this manufacturing process is that the thin elastic material layer ensures a continuous bonding of the textiles together over their full surface, which prevents gathers.

The reinforcements can be in any shape, irrespective of the adornments produced on the fabrics, which allows making undergarments, such as brassieres, that have great strength while providing freedom of movement.

In addition, cutouts of the undergarment contour can be made at any locations outside the reinforcements, presenting a bond between both textiles that remains well assured.

The undergarments thus obtained can be very delicate and transparent, heavily adorned while maintaining an exceptional flexibility and strength.

The manufacturing process according to the disclosure can also comprise one or several of the following features which may be combined among each other.

In particular, the manufacturing process may comprise a polymerization step of the reinforcement layer, prior to polymerization of the thin bonding layer.

In addition, the process may comprise steps of depositing several reinforcement layers on at least one of the textiles, on each occasion, after polymerization of the previous layer. This way, variable thicknesses and elasticities of the reinforcement are achieved according to the placement.

In particular, the last reinforcement layer can be polymerized at the same time as the thin bonding layer during thermoforming. This produces good bonding cohesion with the last reinforcement layer.

The manufacturing process may comprise a prior depositing step onto the textile receiving the reinforcement layer, of a barrier layer of an elastic material which is polymerized before depositing this reinforcement.

Advantageously, after polymerization of the thin bonding layer during thermoforming, the process comprises a step for cutting out the edges of the undergarment. Clear cutouts of the edges are obtained.

The purpose of the disclosure is also an undergarment that has two superimposed or layered textiles comprising among themselves at least a thick reinforcement layer that is produced with a manufacturing process that has any of the preceding features.

Advantageously, the elastic shaped memory foam material as well as the elastic bonding material, is a silicone. This material comprises good elasticity as well as temperature stability.

In this case, the silicone can have a hardness of about 30 Shore.

Advantageously, the textiles have an elongation capacity of at least 125% in one of the directions. This way, the textiles can follow the person's movements.

In addition, the purpose of the disclosure is a brassiere consisting of an undergarment comprising any of the preceding features, that comprises at least a reinforcement layer in the bottom part of the cups holding the breasts. These lower reinforcements provide an effective support of the breasts and ensure their shape.

In particular, the cutout of the brassiere edge that is above the cups, may not comprise any thick reinforcement layer. A discreet appearance of this upper part is obtained that may be visible.

BRIEF DESCRIPTION OF THE DRAWINGS

The disclosure will be better understood and other features and benefits will become clearer upon reading the following description given as an example, in reference to the attached drawings in which.

DETAILED DESCRIPTION

Figure 1:
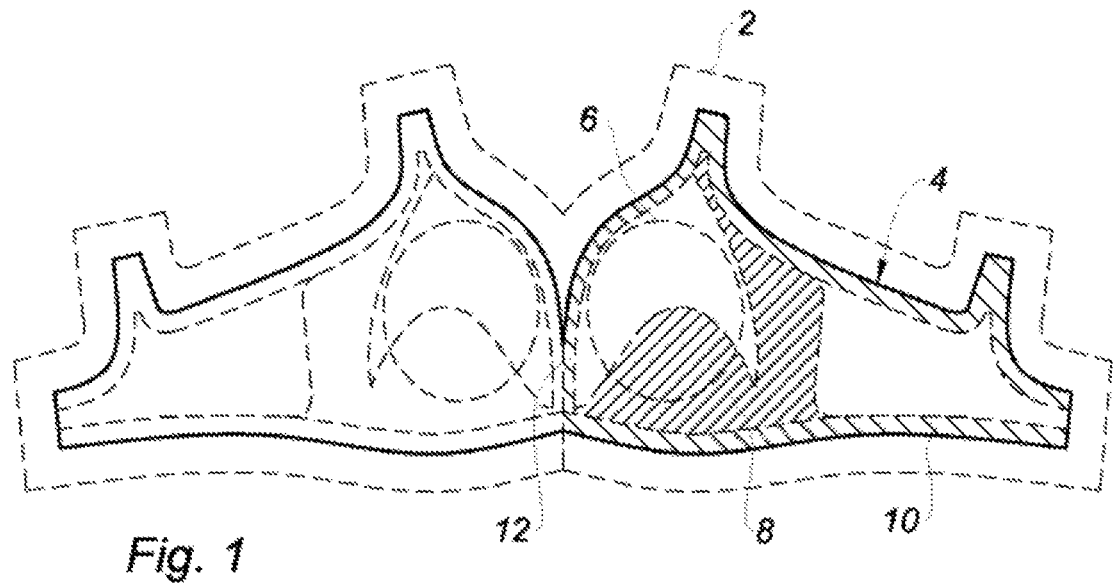
FIG. 1 is a drawing of a brassiere comprising reinforcement areas, produced with a process according to the prior state of the art mentioned above.

FIG. 1 shows a sketch 2 which once finished shall be cut out according to the final outside contour 4, then, will receive devices in order to make a brassiere.

The brassiere comprises a piece of textile produced from an elastic and light material made of a synthetic or natural fiber fabric.

The brassiere comprises cups 6 shaped by thermoforming, to hold the woman's breasts and to support them while giving them an aesthetic shape.

Reinforcements 8 forming a thick silicone layer are deposited on the full outer periphery 10 of the brassiere, on the central link 12 between the two symmetrical parts, as well as on the bottom part of the cup 6 by substantially covering an area of about 90° whose center coincides with the center of the cup.

Preferably, a medical grade silicone is used to prevent reactions with the skin, and which is deposited according to a thickness comprised between 0.5 and 1 mm, on the inside or outside of the fabric.

The silicone is polymerized at a temperature between 150 and 200° C., for instance in an oven, with a heat press, or by infrared radiation. Cups 6 are then thermoformed in a mold to give a configuration to the fabrics and to obtain the final shape.

Figure 2:
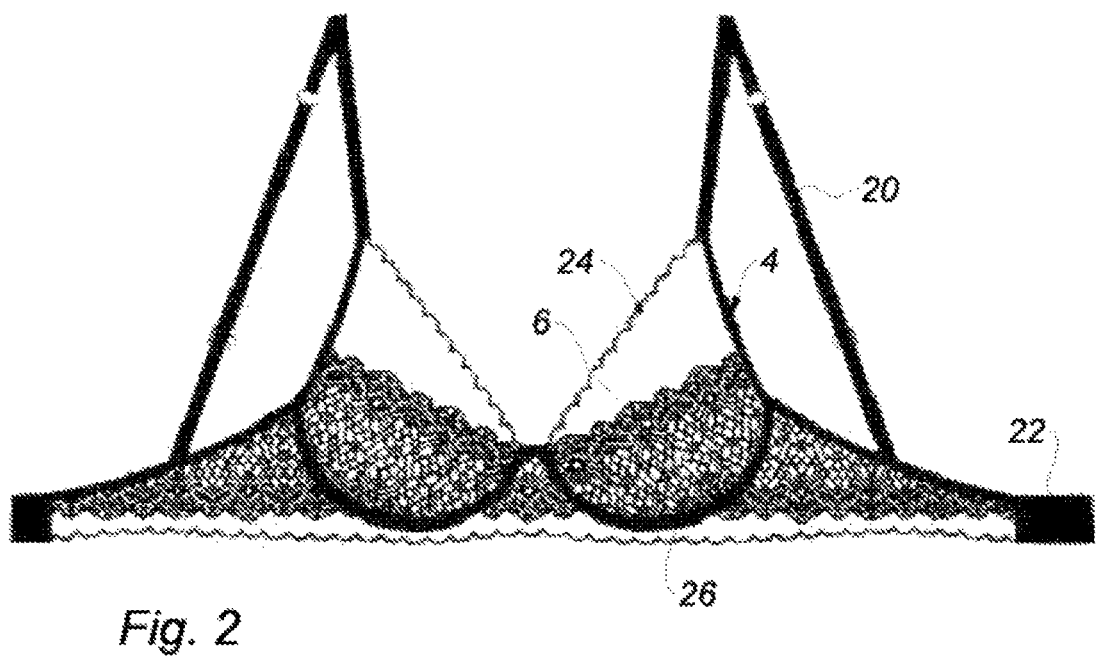
FIG. 2 is a drawing of a brassiere produced with the process according to the disclosure.

FIG. 2 shows a brassiere according to the disclosure that is fully finished, comprising also the straps 20 and hooking means on the back 22.

Since stretching of the silicones used for the reinforcements 8 can be about 600% before breaking, textiles are used that have considerable stretching capability, which is preferably at least 125% in one direction, and if possible more than 125% in both directions, so as to following the deformity of these reinforcements.

In particular, a bi-component silicone can be used.

A manufacturing process of this brassiere is as follows. The silicone forming the reinforcement layer 8 is deposited according to a thickness comprised advantageously between 0.1 and 3 mm, on the side of a first piece of textile called inside, that will be laid on a second piece of textile.

This deposit can advantageously be achieved according to a precise design by a screen printing process, with the deposit of a fine grid comprising partially separated openings according to the reinforcement areas to be achieved, then, by sliding a scraper over this grid so as to force the passage of the substance on top, through the openings.

With this screen printing process, in particular, a silicone impregnation in the textile is obtained, which increases its strength, in other words, the return force to its initial position.

In parallel, a thin silicone layer is deposited onto the full inside face of the second piece of textile, which is advantageously comprised between 0.005 and 0.1 mm.

For these layers in particular, a silicone comprising a hardness of about 30 Shore is very appropriate for the brassiere applications.

The two textiles are assembled by placing the inside faces comprising their silicone layers one onto the other. Then, this assembly is placed in a mold to shape the cups and the assembly is baked so as to produce simultaneously a cross-linking of the two layers and a shaping of the textiles by thermoforming.

The accessories like the straps 20 or the stapling means 22 can be secured at the same time during polymerization, or installed afterwards.

After cutting out the contour 4, a finished product is achieved that is particularly homogeneous, with the two textiles being bonded together over their surfaces as a whole, while maintaining very great flexibility. In particular, one can achieve after the cutout an edge 24 of the brassiere on top of the cups 6, which is very thin and almost transparent since it does not comprise any thick reinforcement layer.

One can also produce a very intricate adornment on the bottom part of the cups 26 which will not show any gathers, which preserves the aesthetic appearance of this adornment.

The synthetic or natural fibers of the fabrics can be polyester, polyamide, colon, modal or viscose. Please note that the thin bonding layer can contribute a better resistance during thermoforming of the fabrics using natural fibers which usually do not do well for this operation.

As a variant of this process, first one can do a polymerization of the silicone of the thick reinforcement layer 8, deposited on the first textile, which is done flat or according to a first shape. Then, the second textile is deposited comprising its thin and complete bonding layer, onto the first textile, and the assembly is deposited onto the mold giving it the final shape. Then, by heating in an oven, simultaneously, the textiles are thermoformed and the thin silicone bonding layer is polymerized.

In addition, several reinforcement layers 8 can be deposited onto one or both textiles, each time with polymerization of the preceding layer. The layers are partially superimposed so as to obtain thickness variations of this reinforcement with variable stretching and strength features according to the locations.

Final polymerization of the thin bonding layer and thermoforming of the textiles can then take place with the last already polymerized reinforcement layer or at the same time as polymerization of this last layer.

Please note that since the crosslinked silicone is not sensitive to temperature, baking to achieve the bonding does not modify the thick silicone reinforcement layer which is already polymerized, and in particular the shape that has already been given to it. Consequently, the undergarment has a very good resistance to warm washing thanks to the silicone inertia; its shape as well as its elasticity remain constant.

In particular, the thin layer of bonding silicone deposited can be transparent which permits, when using very light textiles, to obtain nearly transparent areas. As a variant, a colored silicone may be used to obtain certain aesthetic effects.

In addition, the process may comprise the deposit onto the textile receiving the reinforcement layer 8, a barrier layer before depositing this reinforcement layer. After polymerization, the barrier layer constitutes a protection that permits to maintain on the textile that the reinforcement layer 8 remains wet during the handling operations before its final polymerization. This way, running of the wet silicone over the textile is prevented, in particular for textiles with designs that comprise considerable openings.

What is claimed is:

1. An undergarment, comprising:
   two layered textiles comprising between them at least one reinforcement layer, the at least one reinforcement layer comprising a polymerized elastic shaped memory foam material,
   a layer of a polymerized elastic bonding material over a full surface of at least one of the two layered textiles, and
   a barrier layer of a polymerized elastic material deposited on a first layered textile of the two layered textiles between the at least one reinforcement layer and the first layered textile.

2. Undergarment according to claim 1, wherein the elastic shaped memory foam material and the elastic bonding material comprise a silicone.

3. Undergarment according to claim 2, wherein the silicone has a hardness of about 30 Shore.

4. Undergarment according to claim 1, wherein the textiles have a stretching capacity of at least 125% in one direction.

5. The undergarment of claim 1, wherein the undergarment is a brassiere, wherein the at least one reinforcement layer is positioned in a bottom part of cups of the brassiere, the cups of the brassiere configured to hold breasts of a wearer of the brassiere.

6. The undergarment according to claim 5, wherein a cutout of an edge of the brassiere that is located on a top of the cups does not include the reinforcement layer.

7. The undergarment according to claim 2, wherein the silicone forming the reinforcement layer is deposited according to a thickness between 0.1 mm and 3 mm, and the layer of elastic bonding material is deposited according to a thickness between 0.005 and 0.1 mm.

8. The undergarment according to claim 3, wherein the textiles have a stretching capacity of at least 125% in one direction.

9. The undergarment according to claim 4, wherein the textiles have a stretching capacity of more than 125% in both a lateral direction and a longitudinal direction.

10. The undergarment according to claim 1, wherein the at least one reinforcement layer comprises a thickness between 0.1 mm and 3 mm.

11. The undergarment of claim 1, wherein the layer of polymerized elastic bonding material comprises a thickness between 0.005 and 0.1 mm.

* * * * *